United States Patent [19]

Paro

[11] Patent Number: 5,144,924
[45] Date of Patent: Sep. 8, 1992

[54] INTERNAL COMBUSTION ENGNE, AND METHOD FOR ACHIEVING IGNITION OF FUEL IN AN INTERNAL COMBUSTION ENGINE

[75] Inventor: Daniel Paro, Kvevlax, Finland

[73] Assignee: Oy Wartsila Diesel International Ltd., Helsinki, Finland

[21] Appl. No.: 825,825

[22] Filed: Jan. 24, 1992

Related U.S. Application Data

[63] Continuation of Ser. No. 621,583, Dec. 3, 1990, abandoned.

[30] Foreign Application Priority Data

Dec. 4, 1989 [FI] Finland .................. 895775

[51] Int. Cl.$^5$ .............................. F02M 19/00
[52] U.S. Cl. .................................... 123/275
[58] Field of Search ............... 123/275, 274, 253, 267,
123/260, 298, 145 R, 145 A, 143 R, 525, 527

[56] References Cited

U.S. PATENT DOCUMENTS

| | | | |
|---|---|---|---|
| 2,456,080 | 12/1948 | Pe .................................... | 123/253 |
| 3,058,452 | 10/1962 | Espenschied ..................... | 123/254 |
| 4,224,902 | 9/1980 | Binder et al. ..................... | 123/260 |
| 4,250,852 | 2/1981 | Korimov et al. ................. | 123/260 |
| 4,340,019 | 7/1982 | Barnard et al. .................. | 123/253 |
| 4,476,821 | 10/1984 | Robinson et al. ................ | 123/275 |
| 4,483,290 | 11/1984 | Hass .................................. | 123/275 |
| 4,784,097 | 11/1988 | Ishida ............................... | 123/260 |
| 4,852,525 | 8/1989 | Ishida ............................... | 123/260 |
| 4,892,070 | 1/1990 | Kubnert ........................... | 123/274 |
| 4,913,111 | 4/1990 | Ariga ................................ | 123/260 |

*Primary Examiner*—Raymond A. Nelli
*Attorney, Agent, or Firm*—Dellett, Smith-Hill and Bedell

[57] ABSTRACT

A reciprocating internal combustion engine operates by drawing at least substantially only air into the cylinder during the suction stroke and, at the final phase of the compression stroke, injecting gaseous fuel into the cylinder under high pressure. At least part of the fuel is directed to a hot glow body stationarily arranged within the combustion chamber of the cylinder to cause ignition.

6 Claims, 2 Drawing Sheets

INTERNAL COMBUSTION ENGNE, AND METHOD FOR ACHIEVING IGNITION OF FUEL IN AN INTERNAL COMBUSTION ENGINE

This is a continuation of application Ser. No. 07/621,583 filed Dec. 3, 1990 and now abandoned.

BACKGROUND OF THE INVENTION

This invention relates to an internal combustion engine and to a method for achieving ignition of fuel in an internal combustion engine.

In an internal combustion engine, in principle, ignition is conventionally achieved either by compression ignition or by spark ignition. One type of compression ignition engine is the so-called dual-fuel engine, in which a gaseous fuel-air mixture is present in the cylinder at the beginning of the compression stroke and ignition is obtained by injecting into the cylinder a liquid fuel, such as diesel oil, having better ignition properties than the gaseous fuel already present in the combustion chamber. A disadvantage of such an arrangement is that the gaseous fuel-air mixture must be sufficiently lean to avoid self-ignition. This limits the pressure that can be achieved in the cylinder before ignition, and consequently also the pressure that is achieved after ignition, as well as the power output provided by the engine.

A disadvantage of spark ignition is that it is necessary to interrupt operation of the engine in order to replace the spark plugs when they reach the end of their useful life.

The known hot bulb engine has previously been used with liquid fuels. In the hot bulb engine, the maximum pressure generated in the cylinder through compression is so low that the temperature of the air is not sufficient to achieve ignition of the fuel injected into the cylinder. The engine is provided with a hot bulb whose interior is in communication with the combustion chamber and which is heated from outside of the cylinder so as to be glowing hot. The fuel in the hot bulb quickly becomes gaseous when it enters the bulb and contacts the hot walls of the bulb, and ignition results. The hot bulb engine is subject to the drawback that it is not possible to control the exact moment of ignition. Moreover, the hot bulb engine has a low power output. For these reasons, the hot bulb engine has become obsolete.

SUMMARY OF THE INVENTION

The invention may be used to eliminate the above-mentioned disadvantages of the conventional techniques for achieving ignition and to provide a new and improved reciprocating internal combustion engine using gaseous fuel and a new and improved method for achieving ignition in such an engine.

In accordance with the invention, during the suction stroke the piston sucks at least substantially only air into the cylinder, and during the final phase of the compression stroke gaseous fuel is injected into the cylinder at high pressure in a manner such that part of the fuel is directed toward a hot glow body mounted stationarily within the combustion chamber of the cylinder thereby causing ignition. The moment of ignition is determined by the moment of injecting the gaseous fuel directed toward the glow body, and therefore it is possible to exactly control the moment of ignition. Hence, it is possible to improve the entire combustion process making it possible also to more effectively reduce especially the concentration of nitrogen oxides, $NO_x$, in the exhaust gases as well as possibly diminish other undesirable constituents of the exhaust gases.

As the cylinder is filled with only, or at least substantially only, air during the compression stroke before injecting the gaseous fuel, the risk of self ignition does not limit the pressure that can be achieved before or after ignition, and consequently an increased power output can be achieved as compared with the dual-fuel engine. An additional advantage is that a glow body, unlike a spark plug, has a virtually unlimited useful life.

Injection of the fuel can with advantage be accomplished with two separate valves, so that the major part of the fuel is injected into the cylinder through a main valve and a minor part of the fuel is directed on the glow body by means of an auxiliary injection valve.

The glow body can with advantage be spiral-formed, but of course also other suitable forms may be used as well, for instance the form of a corrugated plate. It can be made of ceramic material, which is durable against high pressures and temperatures and remains clean. The glow body can with advantage be preheated electrically and can be located in a separate auxiliary chamber in immediate communication with the main combustion chamber of the cylinder.

BRIEF DESCRIPTION OF THE DRAWINGS

The invention is illustrated by way of example in the attached drawing, in which.

In the different figures, like reference numerals designate corresponding components.

DETAILED DESCRIPTION

Figure 1:
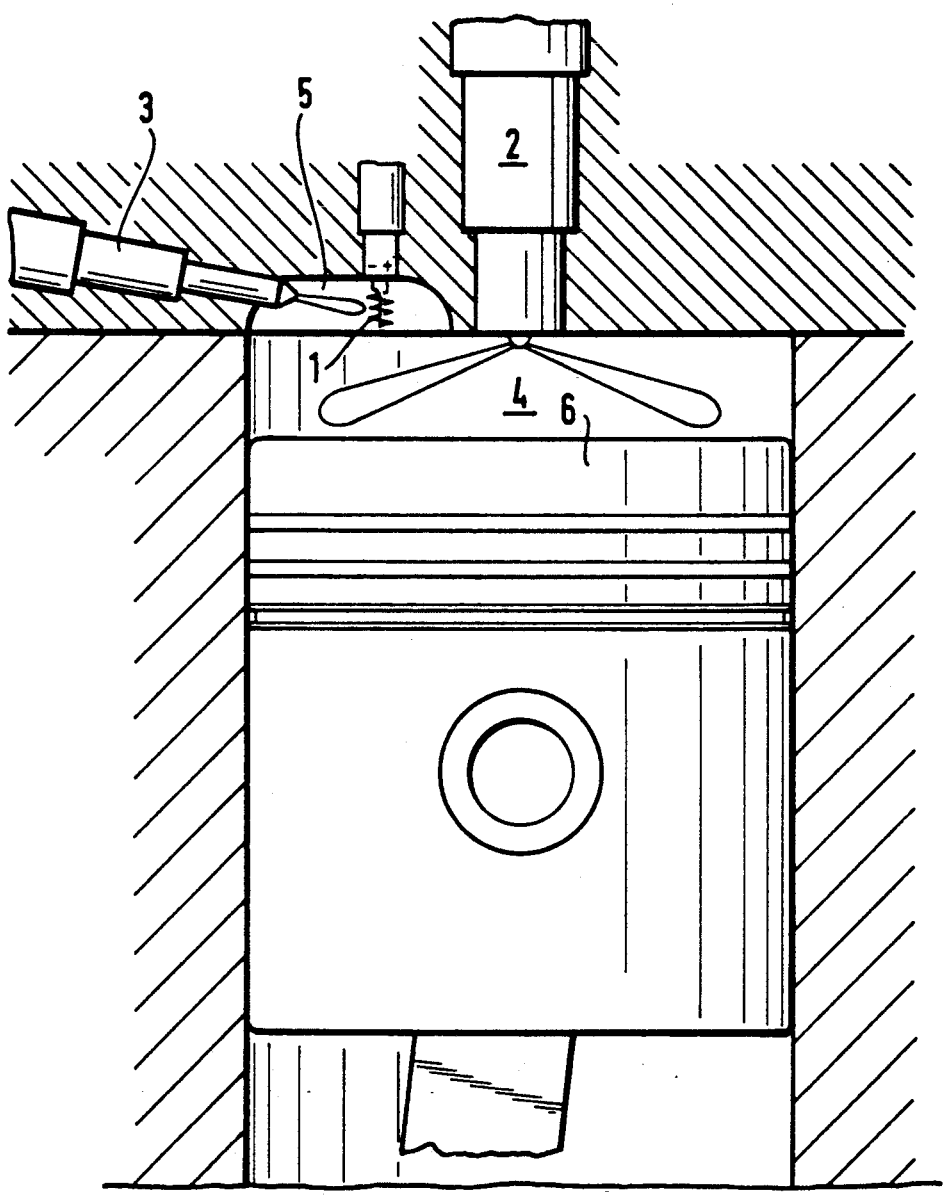
FIG. 1 is a sectional view of a cylinder of an engine provided with a first version of an ignition arrangement according to the invention.
Figure 2:
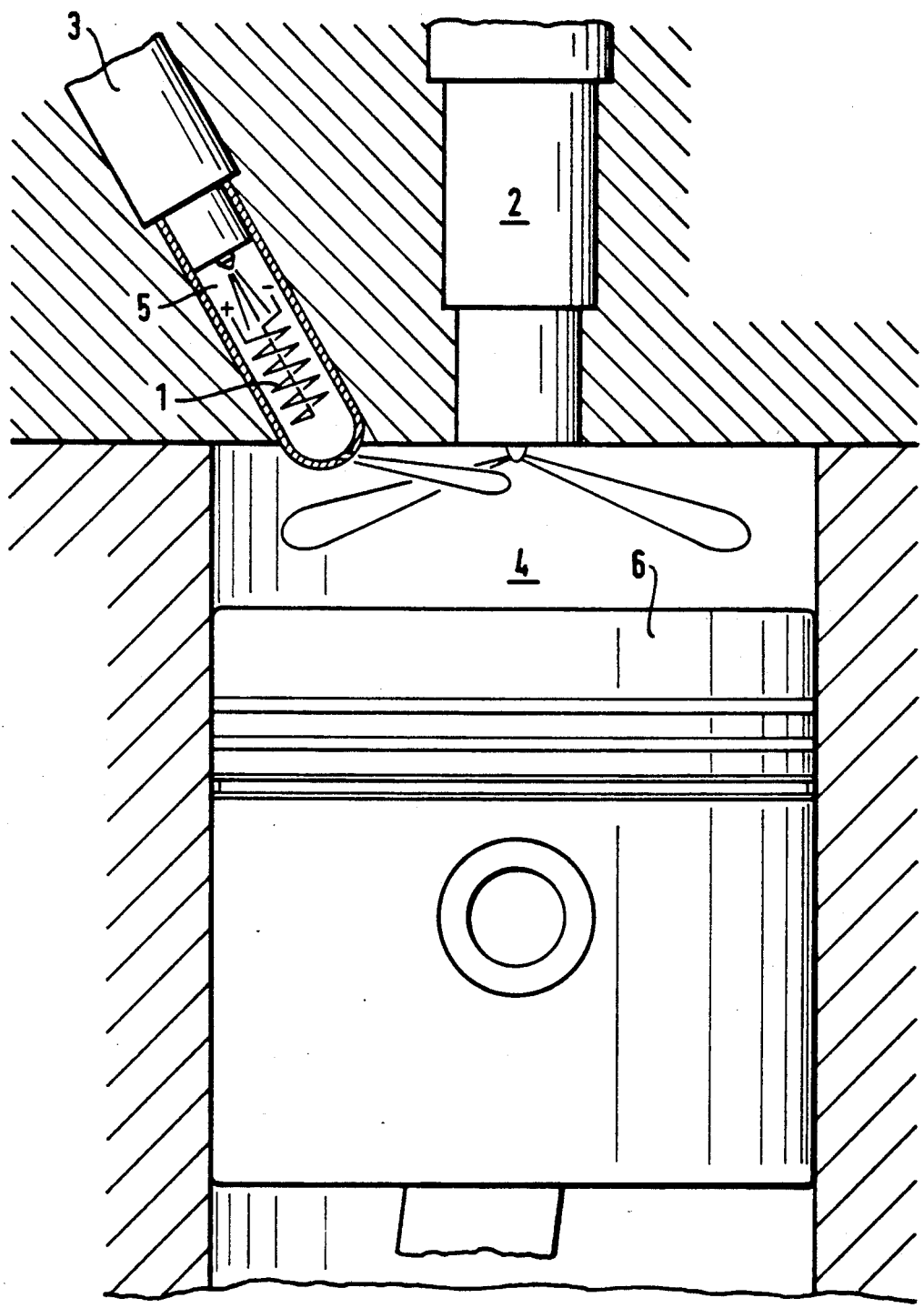
FIG. 2 is a sectional view of a cylinder of an engine provided with a second version of an ignition arrangement according to the invention.

FIGS. 1 and 2 each show a main valve 2 arranged to inject fuel into a main combustion chamber 4 defined by the cylinder of the engine and a piston 6 arranged to be reciprocatingly movable within the cylinder. A spiral-formed glow body 1 is located in an auxiliary chamber 5, which is arranged in immediate communication with the main combustion chamber 4 and into which fuel is injected through an auxiliary valve 3 for providing ignition. During the suction stroke of the piston, only air is drawn into the cylinder. Gaseous fuel is injected into the cylinder under a high pressure at the final phase of the compression stroke, i.e. within the range of movement of the piston in which ignition normally occurs in an internal combustion engine. The major part of the fuel is injected through the main injection valve 2 and a minor part is injected through the auxiliary valve, which is positioned to direct fuel toward the glow body.

The embodiments shown in FIGS. 1 and 2 differ from each other mainly in the design of the auxiliary chamber 5. In the embodiment shown in FIG. 2, the glow body 1 is supported at several locations on the inner walls of the auxiliary chamber 5.

The glow body 1 may be made of ceramic material, in which case it may comprise a core or inner support structure preferably made of metal having good mechanical strength properties and a ceramic coating deposited on the core to provide a surface that is very hard and is able to withstand high temperature conditions. The glow body 1 needs only to be preheated, which can with advantage be arranged electrically, and thereafter it remains hot enough due to the heat provided by the combustion process itself. In the case of a glow body having a metal core, the glow body may be preheated by passing electrical current through the core.

The invention is not limited to the embodiments shown, but several modifications are feasible within the scope of the attached claims.

What is claimed is:

1. A method for achieving ignition in a reciprocating internal combustion engine provided with at least one cylinder, said method including the following steps:

sucking substantially only air into the cylinder during the suction stroke of the piston, and injecting gaseous fuel into the cylinder at high pressure at the final phase of the compression stroke by (a) injecting the major part of the fuel through a main injection valve that injects directly into the combustion chamber of the cylinder, and (b) injecting a minor part of the fuel through an auxiliary injection valve positioned to direct fuel toward a hot glow body stationarily arranged within the combustion chamber of the cylinder for determining the moment of ignition.

2. An internal combustion engine having at least one cylinder enclosing a reciprocatingly movable piston member, a glow body stationarily arranged in the combustion chamber of the cylinder, and injection valve means for injecting gaseous fuel into the cylinder, said injection valve means comprising a main valve for injecting a major part of the fuel directly into the cylinder and an auxiliary valve for injecting a minor part of the fuel toward said glow body for determining the moment of ignition.

3. An engine according to claim 2, wherein said glow body is spiral in configuration.

4. An engine according to claim 2, wherein said glow body is located in a separate auxiliary chamber in immediate communication with the main combustion chamber of the cylinder.

5. An engine according to claim 2, wherein said glow body comprises ceramic material.

6. An engine according to claim 2, wherein the glow body includes means for electrically preheating the glow body.

* * * * *